United States Patent
Doane

(10) Patent No.: US 9,828,828 B2
(45) Date of Patent: Nov. 28, 2017

(54) SEAT ARRANGEMENT, METHOD FOR CREATING A SEAT AND METHOD FOR FRACTURING A BOREHOLE

(71) Applicant: James Doane, Friendswood, TX (US)

(72) Inventor: James Doane, Friendswood, TX (US)

(73) Assignee: BAKER HUGHES, a GE company, LLC, Houston, TX (US)

( * ) Notice: Subject to any disclaimer, the term of this patent is extended or adjusted under 35 U.S.C. 154(b) by 497 days.

(21) Appl. No.: 14/506,092

(22) Filed: Oct. 3, 2014

(65) Prior Publication Data

US 2016/0097255 A1    Apr. 7, 2016

(51) Int. Cl.
| | |
|---|---|
| *E21B 33/128* | (2006.01) |
| *E21B 43/26* | (2006.01) |
| *E21B 34/14* | (2006.01) |

(52) U.S. Cl.
CPC ........ *E21B 33/1285* (2013.01); *E21B 33/128* (2013.01); *E21B 34/14* (2013.01); *E21B 43/26* (2013.01); *Y02C 10/14* (2013.01)

(58) Field of Classification Search
CPC ........... E21B 2033/005; E21B 33/1208; E21B 33/128
See application file for complete search history.

(56) References Cited

U.S. PATENT DOCUMENTS

| | | | | |
|---|---|---|---|---|
| 2,230,712 A | * | 2/1941 | Bendeler | ............... E21B 33/128 166/123 |
| 3,556,217 A | * | 1/1971 | Anastasiu | ............. E21B 33/129 166/217 |
| 4,791,992 A | * | 12/1988 | Greenlee | ............... E21B 33/128 166/187 |
| 4,934,459 A | | 6/1990 | Baugh et al. | |
| 6,666,276 B1 | | 12/2003 | Yokley et al. | |
| 8,109,340 B2 | * | 2/2012 | Doane | ................. E21B 33/1216 166/138 |
| 8,459,347 B2 | * | 6/2013 | Stout | ..................... E21B 17/026 166/138 |
| 9,303,477 B2 | * | 4/2016 | Harris | ..................... E21B 23/01 |
| 2008/0061510 A1 | | 3/2008 | Li et al. | |
| 2010/0294510 A1 | * | 11/2010 | Holmes | ................... E21B 41/00 166/376 |
| 2012/0292014 A1 | | 11/2012 | Bishop | |
| 2013/0048313 A1 | * | 2/2013 | VanLue | ................. E21B 33/128 166/387 |
| 2013/0186616 A1 | * | 7/2013 | Xu | ......................... E21B 33/129 166/212 |
| 2013/0186649 A1 | * | 7/2013 | Xu | ......................... E21B 23/01 166/382 |

(Continued)

OTHER PUBLICATIONS

Halliburton, [online]; [retrieved from on Sep. 24, 2012]; retrieved from the Internet http://www.halliburton.com/public/tttcp/contents/Data_Sheets/web/H/H06160.pdf, "Fas Drill® Bridge Plug," 2p.

(Continued)

*Primary Examiner* — Robert E Fuller
*Assistant Examiner* — Steven MacDonald
(74) *Attorney, Agent, or Firm* — Cantor Colburn LLP

(57) ABSTRACT

A degradable seat arrangement consisting of a pusher; a cone having a tapered face; and a seal having a seal deformation face configured to contact the tapered face. A method for creating a seat in a borehole.

4 Claims, 2 Drawing Sheets

(56) References Cited

U.S. PATENT DOCUMENTS

| | | | |
|---|---|---|---|
| 2014/0014339 A1 | 1/2014 | Omalley et al. | |
| 2015/0060088 A1* | 3/2015 | Goodman | E21B 33/1285 |
| | | | 166/387 |
| 2015/0129215 A1* | 5/2015 | Xu | C22C 1/0408 |
| | | | 166/285 |
| 2015/0308250 A1* | 10/2015 | Anders | E21B 33/12 |
| | | | 166/308.2 |
| 2015/0337619 A1* | 11/2015 | Hern | E21B 23/01 |
| | | | 166/376 |
| 2016/0281483 A1* | 9/2016 | Anders | E21B 33/12 |
| 2017/0130553 A1* | 5/2017 | Harris | E21B 23/01 |

OTHER PUBLICATIONS

Notification of Transmittal of the International Search Report and the Written Opinion of the International Searching Authority, or the Declaration; PCT/US2015/046796; dated Nov. 30, 2015; 10 pages.

* cited by examiner

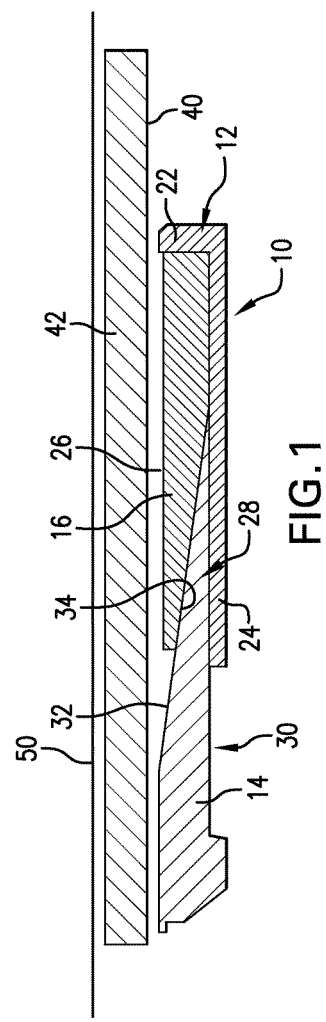
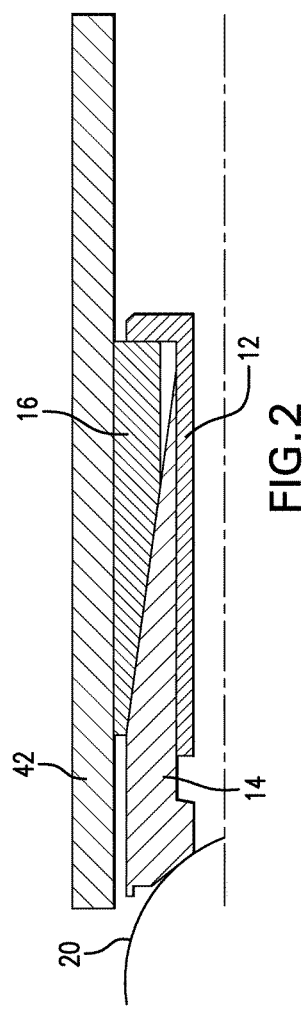

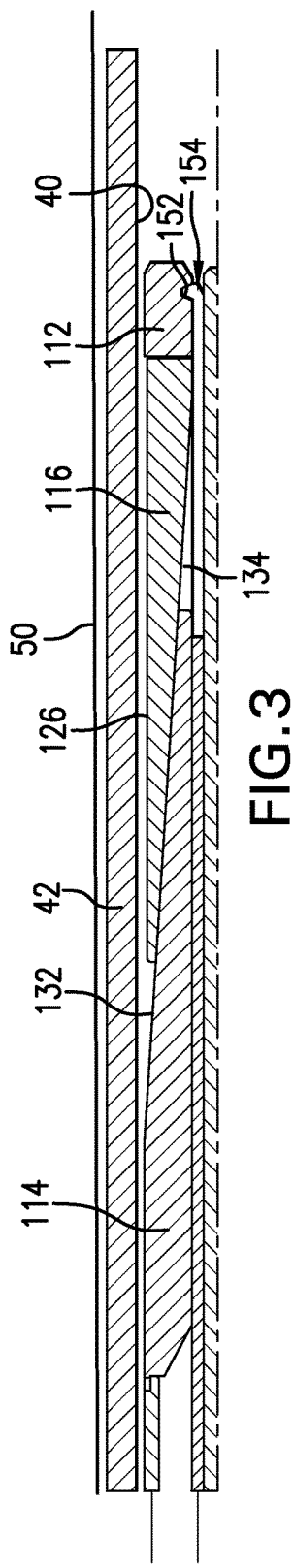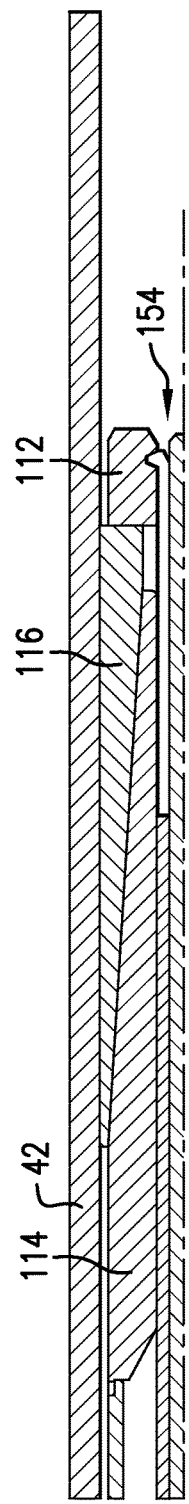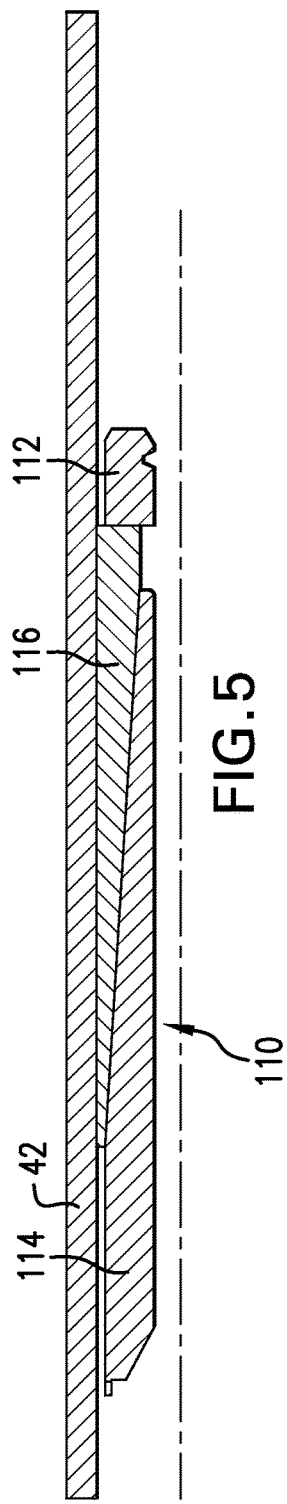

SEAT ARRANGEMENT, METHOD FOR CREATING A SEAT AND METHOD FOR FRACTURING A BOREHOLE

BACKGROUND

In the hydrocarbon exploration and recovery as well as carbon dioxide sequestration industries, fracturing of downhole formations has been found to enhance the desired result of the operation. Since boreholes are long and fracturing is generally undertaken at a number of locations, usually related to target zones of the formation, it is necessary to provide means of sealing off various sections of the borehole in order to raise pressure in a target zone for fracturing. This may be done from one to hundreds of times depending upon the length of the borehole and the density of fracture initiation desired. Attendant this required provision for sealing off and pressuring up is the ultimate need to remove what after the fracturing operation become unnecessary restrictions in the completed wellbore. This can be costly and time consuming. Accordingly, the art will well receive alternative arrangements and methods that reduce cost in disposing of inside diameter restrictions post fracturing.

SUMMARY

A degradable seat arrangement consisting of a pusher; a cone having a tapered face; and a seal having a seal deformation face configured to contact the tapered face.

A seat arrangement including a pusher; a cone having a tapered face with an angle relative to a cone longitudinal axis of about 10 degrees or less; and a seal having a seal deformation face configured to contact the tapered face.

A method for creating a seat in a borehole including running to a selected location in a borehole a seat arrangement including a pusher, a cone having a tapered face with an angle relative to a longitudinal axis of the cone of about 10 degrees or less, and a seal having a seal deformation face having a similar angle relative to the cone longitudinal axis and configured to interact with the tapered face; shortening a run-in length of the combination of the pusher and the cone; and radially deforming the seal.

A method for fracturing a borehole includes running to a selected location in a borehole a seat arrangement including a pusher, a cone having a tapered face with an angle relative to a longitudinal axis of the cone of about 10 degrees or less, and a seal having a seal deformation face having a similar angle relative to the cone longitudinal axis and configured to interact with the tapered face; shortening a run-in length of the combination of the pusher and the cone; and radially deforming the seal; sealing the seat with a plug; and pressuring against the plug and seat to initiate a fracture in a formation defining the borehole.

BRIEF DESCRIPTION OF THE DRAWINGS

The following descriptions should not be considered limiting in any way. With reference to the accompanying drawings, like elements are numbered alike:

FIG. 1 is a quarter section view of a seat arrangement as disclosed herein in an unset condition; and FIG. 2 is a quarter section view of the seat arrangement of FIG. 1 in a set condition;

FIG. 3 is a quarter section view of an alternate arrangement in an unset condition;

FIG. 4 is a quarter section view of the embodiment of FIG. 3 in a set condition; and FIG. 5 is a quarter section view of the embodiment of FIG. 3 in the set position with the running tool removed.

DETAILED DESCRIPTION

Referring to FIG. 1, a seat arrangement 10 includes a pusher 12, a cone 14 and a seal 16. These components work together to provide a positionally stable and peripherally sealed seat (when in the set position of FIG. 2) and receptive to a centrally positioned plug (illustrated in FIG. 2 at 20) that may be run with the arrangement 10 or thereafter.

The pusher 12 comprises a seal block 22 extending radially of a tubular cone support 24 that is arranged to be substantially parallel to a seal surface 26. The seal block 22 functions to prevent the seal 16 from being displaced longitudinally during its deformation radially due to action of the cone 14. The cone support 24 features a surface 28 that supports cone 14 during the axial motion thereof that is then translated to radial deformation of the seal 16.

The cone 14 presents slide face 30, which is in sliding contact with the cone support surface 28 and a tapered face 32 configured to interact with the seal 16 through seal deformation face 34. Importantly, in one embodiment, the angle between the slide face 30 and the tapered face 32 is less than or equal to about 10 degrees. In another embodiment, the angle is less than or equal to about 4 degrees. In another embodiment the angle is between about 3 degrees and about 4 degrees. In all embodiments contemplated the angles of the tapered face 32 are selected to maximally deform the seal 16 in a radially outward direction with a reasonable stroke and an avoidance of excessive impetus to cause axial movement of the seal 16. The angles stated have been found to produce desirable results in these properties such that contact pressure is increased between the seal and the casing, and the seal itself may be axially longer resulting in the improvement of the anchoring capabilities of the seal. It will be understood that some of the improvement in anchoring properties will be as a result of more seal area deforming into casing irregularities because of the longer seal length.

Through the action of the pusher 12 and cone 14, the seal 16 is radially outwardly urged into contact with a surface 40 of a casing 42 with sufficient force to provide a fluid tight seal as well as an anchoring function. The anchoring function is provided by deformation of the seal 16 into small imperfections in the as rolled casing 42. The longer the seal 16 and the greater the radially outward deformation, the greater the anchoring capability of the seal 16. Advantageously, since anchoring is achieved without any other gripping elements, removal of such gripping elements, which tend to be composed of exceptionally hard material, is avoided.

In an embodiment hereof each element of the seat arrangement 10 is degradable. In one embodiment, the pusher 12 and the cone 14 comprise a degradable high strength material such as a degradable metallic material. In a specific iteration hereof the degradable metallic material is an alloy available commercially from Baker Hughes Houston Tex. under the trade name In-Tallic™ and disclosed in US patent application numbers 2011/0132143, 2011/0135953, 2011/0135530, 2011/0136737, 2013/0047785, 2013/0052472 and 2013/0047784 the entirety of each of which is incorporated herein by reference.

The seal 16 also comprises a degradable material but a greater property of elasticity is desired to enhance both the sealing and anchoring functions thereof as noted above. In one embodiment, the material is polyurethane, one example of which is TDI-Ester Polyurethane that is degradable in water.

In operation, the seal arrangement 10 is run in a borehole 50 and positioned within casing 42. This may be done by a number of possible run-in methods, one embodiment being by wireline such as Baker Hughes product E-4 Wireline Setting Assembly, available from Baker Hughes Incorporated, Houston, Tex. The seal arrangement is then actuated by shortening a run-in length shown in FIG. 1 of the combination of pusher 12 and cone 14 to the total length of the same two components as shown in FIG. 2. The result is the radially outward deformation of seal 16 as discussed above into sealing and anchoring contact with surface 40 of casing 42. According to the foregoing, a method for creating a seat in a borehole is disclosed. Following the successful setting of the seat arrangement, the arrangement 10 is released from the run-in tool and can then be pressured up against providing a plug 20 is on the seat (either from the outset or by running the plug to that location after setting of the seat arrangement) Fracturing operations may be performed with the increased fluid pressure made possible by the seat and plug combination. Following whatever pressure up operation has been undertaken, the entirety of the seat arrangement may be degraded and hence removed from the borehole. The plug too will in some embodiments comprise a degradable material and hence may be degraded or may be removed by other means such as reverse circulation.

In another embodiment, referring to FIGS. 3-5, the borehole 50 and casing 42 are the same while the seat arrangement 110 is somewhat different. Components that are similar will carry one hundred series numerals of those used to describe the similar components in the foregoing embodiment. Pusher 112 provides a similar function but here lacks the tubular extension identified as 24 above. Further, pusher 112 includes a recess 152 configured to be engaged by a setting tool 154. The setting tool may be the E-4 Wireline Setting Assembly or other setting assembly configured to provide the opposing forces needed to set the seat arrangement 110. Seal 116 is positioned adjacent pusher 112 as shown and includes a seal deformation surface 134 as well as a seal surface 126. The seal deformation surface 134 is tapered at less than or equal to about 10 degrees relative to a longitudinal axis of the seal and the cone. In another embodiment, the angle is less than or equal to about 4 degrees. In another embodiment the angle is between about 3 degrees and about 4 degrees. Matching these angles is tapered face 132 on cone 114. During the setting operation, the setting tool 154 will squeeze the components of the seat arrangement 110 together similarly to the embodiments of FIGS. 1 and 2 to cause them to deform the seal 116 into contact with surface 40 and both anchor and seal to that surface. Once the arrangement 110 has been set, the setting tool 154 may be disengaged from the pusher 112 by overpull and withdrawn from the borehole.

As with the previous embodiment, the seal 116, pusher 112 and cone 114 comprise degradable materials. The materials of pusher 112 and cone 114 may be degradable high strength material such as a degradable metallic material. In a specific iteration hereof the degradable metallic material is an alloy available commercially from Baker Hughes Houston Tex. under the trade name In-Tallic™ and disclosed in above listed US patent application numbers the entirety of each of which have been incorporated herein by reference above.

The seal 116 also comprises a degradable material but a greater property of elasticity is desired to enhance both the sealing and anchoring functions thereof as noted above. In one embodiment, the material is polyurethane, one example of which is TDI-Ester Polyurethane that is degradable in water. Subsequent to degradation of the pusher, cone and seal, nothing is left to occlude this area of the casing string. Operation of this embodiment for a fracking job will be similar to the foregoing embodiment.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for creating a seat in a borehole comprising:
shortening a run-in length of a combination consisting of a pusher and a cone having a seat, and a seal, the pusher being radially unaltered during the shortening, the cone having a tapered face with an angle relative to a longitudinal axis of the cone of about 10 degrees or less, and the seal having a seal deformation face having a similar angle relative to the cone longitudinal axis and configured to interact with the tapered face, the arrangement positioned at a predetermined borehole location; and
radially deforming the seal by the shortening to seal and anchor with the borehole.

2. A method for fracturing a borehole comprising:
shortening a run-in length of a combination consisting of a pusher and a cone having a seat, and a seal, the pusher being radially unaltered during the shortening, the cone having a tapered face with an angle relative to a longitudinal axis of the cone of about 10 degrees or less, and the seal having a seal deformation face having a similar angle relative to the cone longitudinal axis and configured to interact with the tapered face, the arrangement positioned at a predetermined borehole location; and
radially deforming the seal by the shortening to seal and anchor with the borehole;
sealing the seat with a plug; and
pressuring against the plug and seat to initiate a fracture in a formation defining the borehole.

3. The method as claimed in claim 2 further comprising degrading the seat arrangement.

4. The method as claimed in claim 2 further including degrading the plug.

* * * * *